Oct. 8, 1935. W. E. WUNDERLICH 2,017,032
CUSHION SPRING ASSEMBLY
Filed May 27, 1932 2 Sheets-Sheet 1

Inventor
William E. Wundertich
By Langdon Moore
Atty.

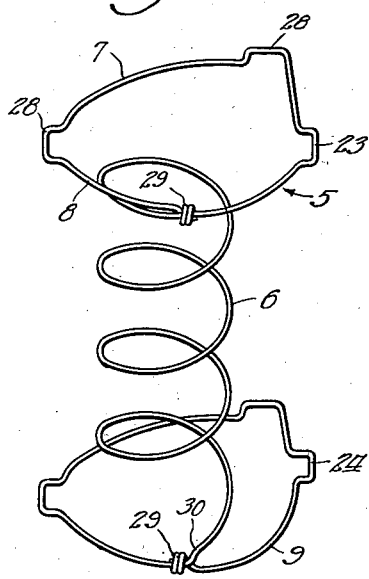
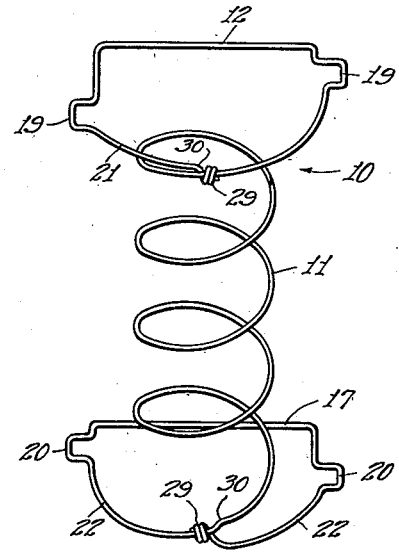
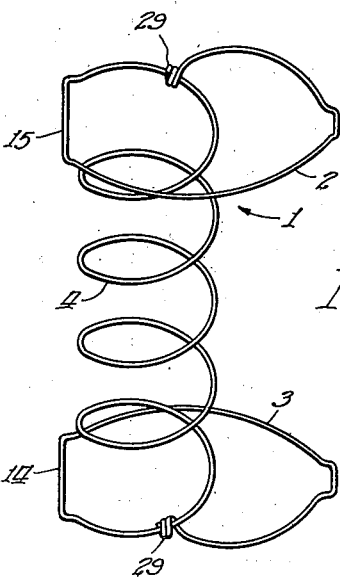

Patented Oct. 8, 1935

2,017,032

UNITED STATES PATENT OFFICE 2,017,032

CUSHION SPRING ASSEMBLY

William E. Wunderlich, Muncie, Ind., assignor to The Moore Company, Muncie, Ind., a corporation of Indiana Application May 27, 1932, Serial No. 613,959

2 Claims. (Cl. 5—260)

This invention relates to coil springs more particularly for cushion spring structures.

The invention is particularly adapted for use in connection with inner spring mattresses for beds and other furniture.

Among other objects, the invention aims to provide an improved cushion spring structure with a substantially square edge and substantially straight side and end margins. Another object of the invention is to provide a spring structure which resists distortion, particularly at the end margins and the corners.

Another object is to provide novel and improved individual coil springs particularly adapted for use in my improved spring structure.

My invention will be understood by reference to the accompanying drawings, in which—

Figure 1:
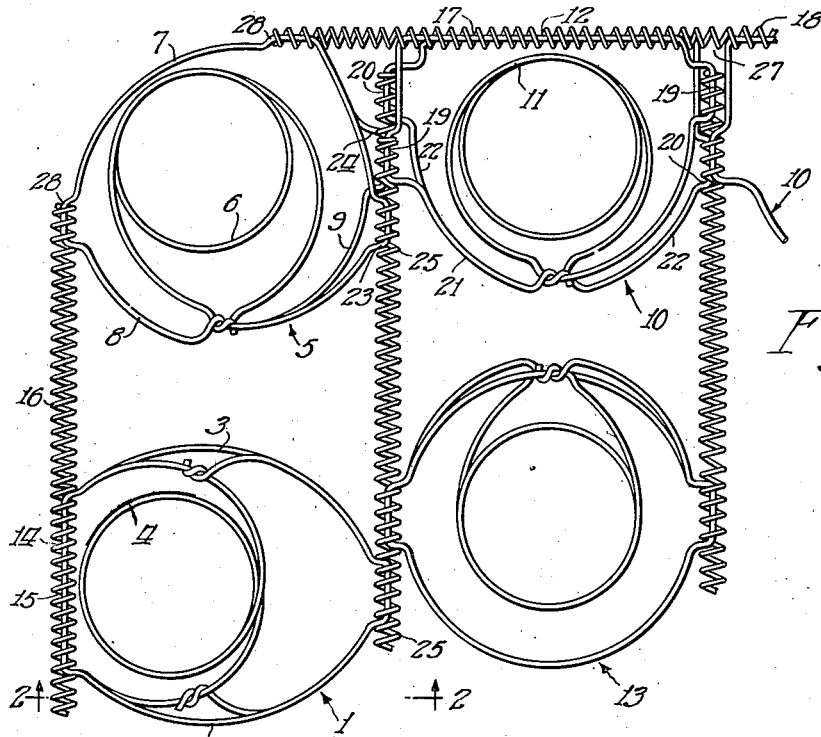
Figure 1 is a partial view of a corner of an exemplary spring structure embodying my invention.

Figures 3, 4, and 5 are separated views of individual springs shown in the structure of Figure 1, Figure 3 being a perspective view of a preferred form of corner spring included in my invention, Figure 4 being a perspective view of a preferred form of end spring included in my invention, and Figure 5 being a perspective view of a preferred form of marginal spring.

In the illustrative construction the coil spring 1 embodies an enlarged closed upper terminal convolution 2 and an enlarged lower closed terminal convolution 3 connected by an integral helical reduced portion 4 constituting the barrel of the spring 1.

Figure 2:
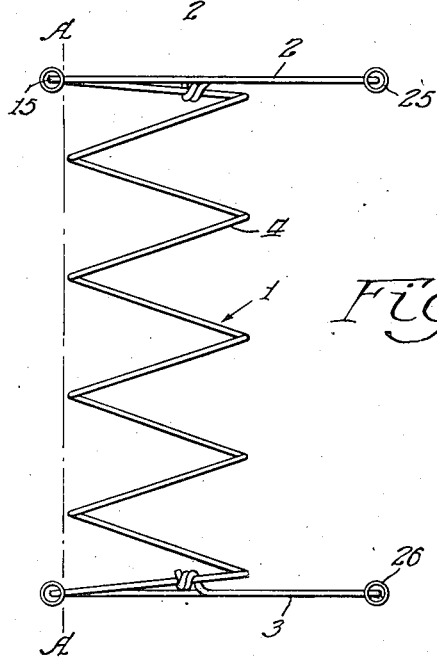
Figure 2 is an elevational view of one form of coil spring embodying my invention and is a view taken on the line 2—2 of Figure 1.

In accordance with my invention this barrel portion 4 of the spring 1 is desirably cylindrical instead of the conventional hour-glass shape and is eccentric with respect to the principal axis of the spring 1 as a whole as defined by a vertical line passing through the centers of the convolutions 2 and 3. In this instance, the axis of this barrel portion is shown offset from said center line toward the edge of the assembly, which as shown in Figure 2, is toward the left of the spring 1, which is one of the marginal springs of the assembly. This results in filling out and supporting the edge of the assembly, a portion of which is illustrated in Figure 1, so as to guard against sagging of the margins of the assembly. As shown in the drawings, the barrel portions of the springs are approximately one-half of the greatest diameter of the terminal convolutions, thus enhancing the resiliency between the axis of the terminal convolutions and the margin of the assembly.

Furthermore, I have shown the helical convolutions of the barrel portion 4 of substantially the same diameter so that each extends out to a common vertical plane represented by the line A (Figure 2) which is closely adjacent to a plane passing through the edge of the assembly as a whole. In other words, the line A is in a plane spaced inwardly from a plane tangent to the terminal convolutions at their margin bordering the edge of the assembly by substantially the thickness of the material of the terminal convolutions. Thus not only is the edge supported and reinforced, but it is desirably filled out, so that a fabric covering material, for example, in which the spring structure is commonly enveloped, will be maintained smooth across the edge of the assembly and an undesirable concave convolution of the edge, which is highly detrimental to an attractive inner spring mattress, is avoided. To avoid clicking or chattering of the springs, it is not desirable that the barrel portion 4 extend out flush with the terminal convolutions 2 and 3 since these terminal convolutions should be permitted to pass the adjacent convolution of the barrel portion 4, should the springs be compressed sufficiently to bring either terminal convolution into the same plane as the adjacent convolution of the barrel portion, but I have shown them extending almost flush so that they may still pass each other and yet produce the square edge effect described.

The spring assembly illustrated in Figure 1 may also advantageously include a corner coil spring 5 having a barrel 6 constructed similarly to the barrel 4 and extending out toward the corner of the assembly to be substantially flush with rounded corner portions 7 providing arcuate portions of fully ninety degrees on the upper and lower convolutions 8 and 9, respectively, of the corner coil spring 5.

Similarly, an end coil spring 10 may have a barrel portion 11 similar to the barrel portions 4 and 6 and extending out to be substantially flush with the end margin 12 of the assembly. The assembly may also include conventional interior springs, such as the coil spring 13.

Springs, such as the spring 1, here represented as located at a side margin 14 of the assembly, desirably have elongated substantially straight portions 15 extending along the side margin of the assembly and having threeded thereabout a connecting spring 16 of small diameter.

End springs, such as the spring 10, also have an elongated straight portion 17 extending along the end margin 12 of the assembly and having threaded thereabout a connecting spring 18 similar to the connector 16. These portions 17 are desirably as long or longer than a diameter of the terminal convolutions of the spring 10.

It will be understood that said elongated portions 15 and 17 of the springs 1 and 10, for example, are not only on the upper convolutions of these springs, but also on the lower convolutions, and in the case of the end springs 10, I have provided shorter substantially straight offset portions 19 and 20 on the upper and lower terminal convolutions 21 and 22, respectively, of the end spring 10. These offsets are duplicated on each terminal convolution, so that there are four offsets on each spring 10 and the offsets 19 on the upper convolution are staggered with respect to each other, while the offsets 20 on the lower convolution are also staggered with respect to each other. Similarly, a pair of offsets 19 and 20 are also staggered with respect to each other. The offsets of each pair 19 and 20 are aligned and are substantially perpendicular with the straight elongated portions 17 and one of the offsets 20, together with one of the offsets 19 is immediately adjacent to the elongated portion 17.

Similarly, the upper convolution 8 of the corner coil spring 5 and the lower convolution 9 of the corner coil 5 have staggered offsets 23 and 24, respectively, which are adapted to be aligned with one each of a pair of offsets 19 and 20 of the coil spring 10. Thus a connecting spring 25 may be threaded about the offset 23 of the corner coil 5 and an offset 19 of the end coil 10. Also a connecting spring 26 at the bottom of the assembly and in the same vertical plane as the connecting spring 25 is threaded about the offset 24 of the corner coil 5 and an offset 20 of the end coil 10. Thus one of the connecting springs in this plane extends substantially to the end margin 12 of the assembly, and, in said plane three of the offsets, such as the offset 23, one of the offsets 19 and one of the offsets 20, occur successively. This construction greatly strengthens the corner of the coil, particularly at the end margins, and offers enhanced resistance to distortion of the assembly as a whole and particularly of the corners of the assembly, which are most apt to break down.

Furthermore, the elongated portion 17 of the end springs 10 is desirably elongated to such an extent that a relatively small gap is left, for example, at 27 between the end springs 10, thus enhancing the strength and appearance of the square end margins.

The marginal connecting springs 18 and 16 desirably engage relatively short offsets 28 on the corner springs 5 which serve to anchor the connecting springs thereto to guard against objectionable relative movement, thus preventing distortion and chattering.

By bringing the barrels, as well as the other parts mentioned, substantially out to the margin of the assembly and providing rectilinear lines wherever possible (except at the corners where round lines are desirable) I provide a spring structure of enhanced strength and attractiveness.

Referring to the perspective views of the individual springs as shown in Figures 3, 4, and 5, it will be noted that the offset barrel portions 4, 6, and 11 of the individual springs 1, 5, and 10 being of a reduced radius with respect to the terminal convolutions of the respective springs and eccentric therewith produce a relatively sharp bend in the terminal convolutions which provides an anchorage for the knotted ends 29 of the terminal convolutions which are wrapped around this portion of the spring material. This minimizes slippage of the knot 29 and to further guard against this, the material of the spring may be slightly kinked as at 30 in the vicinity of the knot 29.

I claim:

1. In a cushion spring assembly, the combination including a plurality of upright parallel coil springs arranged abreast along the margin of the assembly, each coil spring having enlarged upper and lower terminal convolutions and a plurality of reduced intermediate convolutions of substantially uniform diameter, said intermediate convolutions being vertically aligned and having their common axis offset from the principal axis of the terminal convolutions toward the margin of the assembly, whereby the margin of the assembly is filled out and reinforced while the said terminal convolutions extend inwardly of the spring assembly to a point laterally offset and materially spaced from the said intermediate convolutions.

2. In a cushion spring assembly, the combination including a plurality of upright parallel coil springs arranged abreast along the margin of the assembly, each coil spring having enlarged upper and lower closed terminal convolutions and a plurality of reduced intermediate convolutions of substantially uniform diameter, said intermediate convolutions being vertically aligned and having their common axis offset from the axis of the terminal convolutions toward the margin of the assembly, an elongated portion on each of the upper and lower terminal convolutions extending in the direction of said margin slightly offset laterally outwardly of the assembly and said intermediate convolutions, and a light helical connecting spring threaded onto the elongated portions of upper and lower terminal convolutions respectively, there being two of said connecting springs in a vertical plane substantially tangent to all of said intermediate convolutions, whereby the margin of the assembly is filled out and reinforced while the said terminal convolutions extend inwardly of the spring assembly to a point laterally offset and materially spaced from the said intermediate convolutions.

WILLIAM E. WUNDERLICH.